United States Patent [19]

Goglio

[11] 4,181,146

[45] Jan. 1, 1980

[54] TWO-WAY VALVE CLOSING AT BALANCED PRESSURE CONDITION

[76] Inventor: Luigi Goglio, Via Solari 10, 20144 Milan, Italy

[21] Appl. No.: 817,731

[22] Filed: Jul. 21, 1977

[51] Int. Cl.$^2$ ............................................. F16K 17/168
[52] U.S. Cl. .................................. 137/493.9; 137/854; 150/9; 220/206; 229/62.5
[58] Field of Search ................. 150/9; 137/493.9, 512, 137/843, 854; 220/206, 308; 229/62.5

[56] References Cited

U.S. PATENT DOCUMENTS

| 3,568,710 | 3/1971 | Boyer | 137/493.9 |
| 3,949,934 | 3/1976 | Goglio | 150/9 X |

FOREIGN PATENT DOCUMENTS 498438  5/1976  U.S.S.R. .................................. 137/512

Primary Examiner—Robert G. Nilson
Attorney, Agent, or Firm—Steinberg & Blake

[57] ABSTRACT

A two way valve assembly for use in flexible containers having a pair of one-way fluid passages. Thus, the one-way passage provides for fluid flow from the container interior to the external atmosphere while the other one-way passage provides a path for fluid flow from the external atmosphere to the interior of the container. Apparatus is provided for selectively closing one or both one-way fluid flow passages.

4 Claims, 3 Drawing Figures

TWO-WAY VALVE CLOSING AT BALANCED PRESSURE CONDITION

This invention relates to a two-way valve closing at balanced pressure condition for use on flexible containers particularly intended for alimentary products.

One-way valves have been known, which valves when applied to containers, such as flexible containers, allow the outlet of gas being generated within the container, as the pressure of such a gas exceeds the valve activating pressure. Due to the nature thereof, such valves are unsuited for use in containers, wherein the product is to be preserved in special atmospheres, for example nitrogen, since such a valve does not allow introduction of such gases into the container.

It is the object of the present invention to provide a valve for containers, allowing for air evacuation from a closed container, successive introduction of a different gas into the container, and which is completely closed upon reaching balance conditions between gases inside and outside the container.

According to the invention, a valve is essentially characterized as comprising a body having intermediate the two ends thereof a flange for connection or fixing to the container, a perforated lid or cap coupled to each end of said body and defining with the latter a chamber having placed therein a flexible member cooperating with a passage opening on the flange side opposite to that where the flexible shut off member is positioned, said lids or caps being displaceable from a first position to a second position corresponding to full passage shut off.

The invention can be more clearly understood from the following detailed description of a preferred embodiment thereof, as given by mere way of example and shown in the accompanying drawings, in which.

Figure 3:
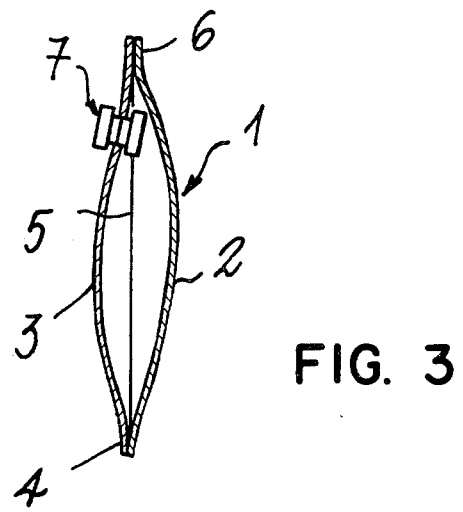
FIG. 3 is a sectional view showing a flexible container (bag) provided with the valve shown in FIGS. 1 and 2.

Referring to the figures of the accompanying drawings, reference numeral 1 designates as a whole a flexible container or bag (best seen in FIG. 3) comprising, for example, two sheets 2 and 3 of heat-sealable material, such as a laminate comprising a plurality of layers, of which one or more intermediate layers may be formed of aluminum. The other layers may be of plastic materials, such as polyethylene, polypropylene, polyester or paper, etc. Preferably, the inner layer is of polypropylene or polyethylene.

Figure 1:
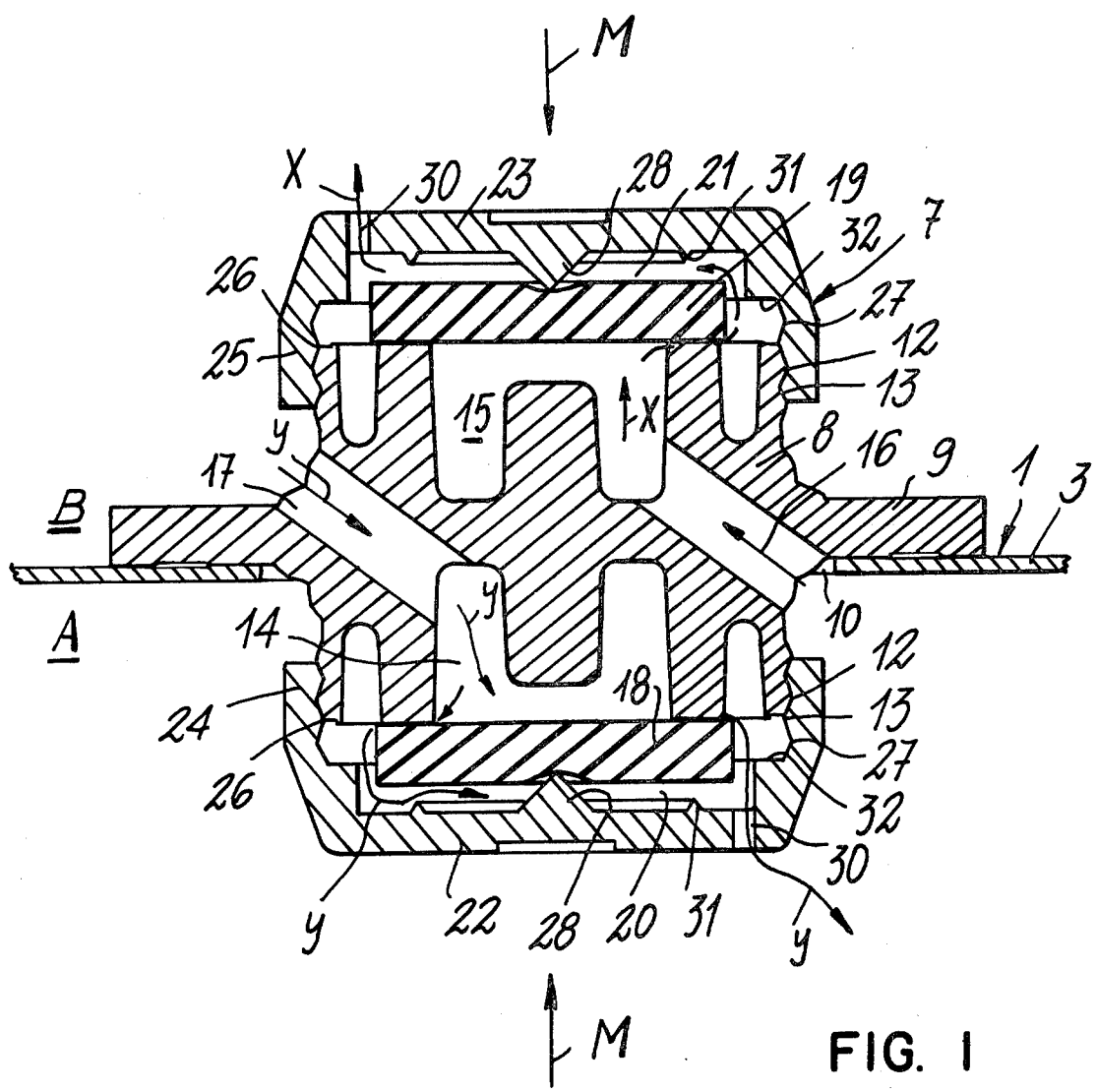
FIG. 1 is an axial sectional view showing a valve according to the invention prior to closing thereof.
Figure 2:
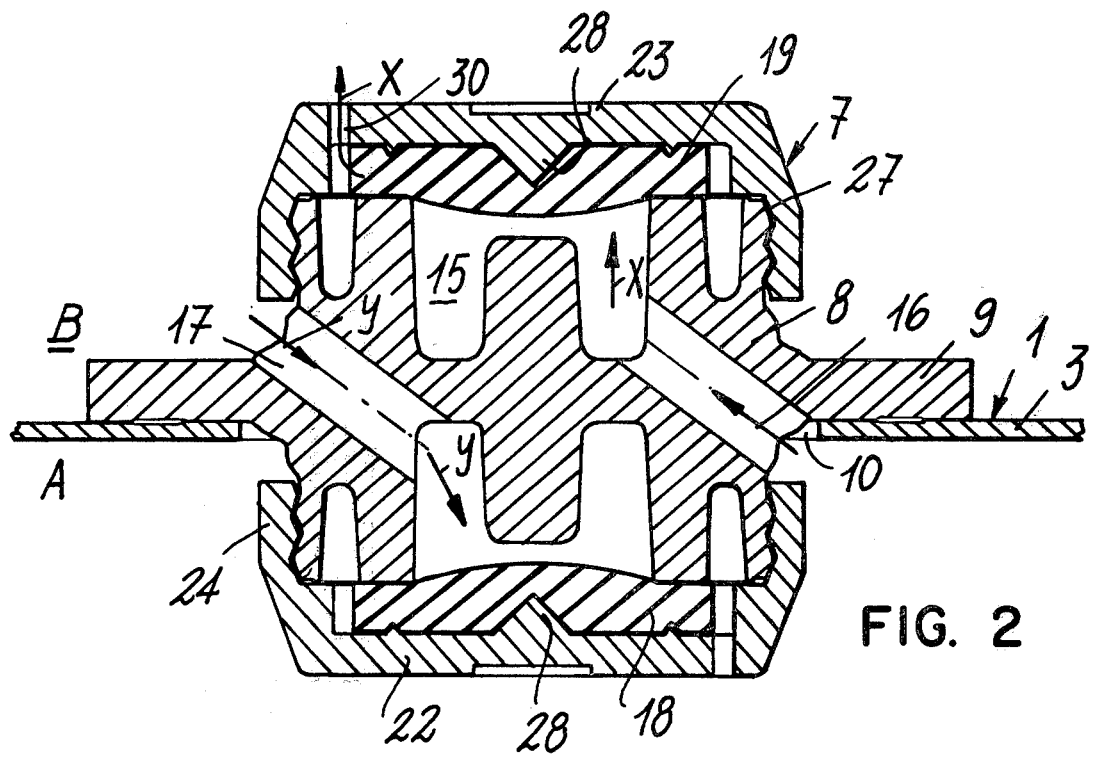
FIG. 2 is another axial sectional view showing the valve at closed condition.

In the case shown, the two sheets 2 and 3 are sealed along three sides 4 and 5 (one of which is not shown in FIG. 3) and, after introducing the product, for example grated cheese, also on the fourth side 6. Referring to FIGS. 1 and 2, an opening or aperture 10 is provided in one of said sheets, this one sheet having a valve generally designated at 7 heat-sealed thereto, particularly along the contour thereof.

The valve comprises a base body 8 of thermoplastic material, such as polypropylene or polyethylene, provided with a flange 9 positioned between the two ends of said body. This flange 9 serves for joining said body 8 and accordingly valve 7 to the container by heat sealing.

On the external face thereof said base body 8 has on both sides of flange 9 a series of annular ridges 12 alternated with depressions 13. These ridges and depressions are of a complementary shape. Said base body 8 also has two recesses 14 and 15 identical to each other and symmetrical with respect to the plane of flange 9, recesses 14 and 15 being mutually fluidly isolated from each other, i.e., the recesses do not fluidly communicate with each other. Each recess opens on a respective outer side of body 8. The spaces defined within each of said recesses fluidly connect with the inlet ends of conduits 16 and 17 respectively. The outlet ends of said conduits are arranged at the sides of flange 9 opposite from the sides of the flange wherein the respective communicating recesses are located. In other terms, should A designate the space within the bag and B the space at the outside, recess 14 located on the side of flange 9 in space A is connected with space B through conduit 17, the opposite occurring for recess 15.

Easily deformable soft discs of rubber 18, 19 adhere against the two end faces of body 8 each located over the outwardly facing opening of a respective one of the recesses 14, 15. Each of these discs 18, 19 are contained within a chamber 20, 21 defined by body 8 and a cup-shaped lid or cap 22, 23, respectively, of thermoplastic material, such as polypropylene.

Lids or caps 22, 23 each have an annularly extending side 24, 25, respectively, the inner face of which is provided with annular ridges 26 alternating with annular depressions 27. These ridges 26 and depressions 27 correspond to ridges and depressions 12 and 13, respectively, of body 8.

At the position shown in FIG. 1, said lids or caps 22 and 23 engage with body 8, so that one ridge and one depression thereof respectively mesh with one depression and one ridge of body 8. Engagement is by snap action by exerting some pressure on lids or caps 22 and 23, taking advantage of elastic deformability thereof. At this position, a central inwardly extending conical strut or projection 28 formed on each of the lids or caps 22 and 23 in effective contact with the outer surface of the corresponding discs 18, 19, so that the discs adhere with some pressure on the corresponding ends of body 8.

Each of said lids or caps 22 and 23 also has a passage 30 fluidly communicating the associated chamber 20, 21 respectively with inner space A and outer space B. About each said conical strut or projection 28 there is provided a continuous annular extending ridge 31 of triangular section and less height than conical strut or projections 28 and larger diameter than recesses 14, 15.

When lids or caps 22 and 23 are fully coupled with body 8 (see FIG. 2), which is achieved by forcibly urging said lids or caps to obtain an interengagement for all of the ridges and all of the depressions so that the annular shoulder 32 defined within each of the lids of caps 22,23 abut against the end faces of body 8, said annular ridges 31 penetrates into said discs 18, 19, deforming the same and causing the latter to forcibly adhere to the end faces of body 8 so that the recesses 14,15 are fluidly sealed from chambers 20,21 respectively.

At the position shown in FIG. 1, valve 1 acts as a two-way valve, i.e., allows passage of fluids from space A to space B and vice versa, when a pressure differential exists, while at the position shown in FIG. 2, said valve is fully closed and no communication is possible in the two directions.

Thus, in FIG. 1, should a depression or vacuum be provided in outer space B, disc 19 would be lifted from the contour of recess 15, by virtue of the pressure differential existing between recess 15 which communicates with inner space A through conduit 16 and chamber 21 which communicates with outer space B through passage 30. Since the peripheral end region of disc 19 is not positively held against the end face of body 8 surrounding recess 15, fluids may pass out of the recess and are allowed to discharge to the atmosphere by following the path of arrows X. When the desired degree of vacuum is attained in space A, a gas, such as an inert gas, is introduced into space B, disc 18 is lifted from the contour of recess 14, by virtue of the pressure differential in a similar manner as described above with respect to disc 19 and accordingly such a gas would reach space A by following the path of arrows Y. At the end of gas introduction into space A, said two lids or caps 22 and 23 are moved to the position of FIG. 2 by inward compression in the direction of arrows M.

Thus, the valve is closed, without any communications between the two spaces being possible.

Although only one embodiment of the invention has been described, those skilled in the art will now readily devise many changes and modifications, all of which are however to be intended as within the scope of the present invention.

What I claim is:

1. A valve assembly for use in a container having a wall defining at least part of the interior of the container comprising: a body member adapted to be fixed to said wall such that an inner portion of said body member extends into said container and an outer portion of said body member extends into the atmosphere exteriorly of said container, an inner recess having an open end formed in said inner body member portion, first conduit means formed in said body member adapted to fluidly communicate said inner recess and the outer atmosphere, an outer recess having an open end formed in said outer body member portion, second conduit means formed in said body member adapted to fluidly communicate said outer recess and the interior of said container;

means for selectively alternately providing a one-way fluid path from said inner recess to the container interior and for sealing said inner recess therefrom comprising a first deformable member located over the open end of said inner recess and manually adjustable means for selectively urging the outer peripheral regions of said first deformable member into sealing engagement with the body member to close the open end of the inner recess; and means for selectively alternately providing a one-way fluid path from said outer recess to the external atmosphere and for sealing said outer recess therefrom comprising a second deformable member located over the open end of said outer recess and manually actuatable means for selectively urging the outer peripheral regions of said second deformable member into sealing engagement with the body member to close the open end of the outer recess, so that a first one-way fluid flow path is defined for selectively conducting and obstructing the flow of fluids into the container interior from the external atmosphere comprising said first conduit means, said inner recess and said first deformable member and so that a second one-way fluid flow path is defined for selectively conducting and obstructing the flow of fluids into the external atmosphere from the containers interior comprising said second conduit means, said outer recess and said second deformable member.

2. The combination of claim 1 wherein each of said manually actuatable means for selectively urging said deformable members into sealing engagement with the body member to close the open end of the respective recesses comprises a lid connected to said body member for movement between first and second positions with respect to said body member, said lid having a central projection normally contacting the respective deformable member and an annular concentrically extending rib which is spaced from the deformable member when said lid is in its first position and which penetrates the deformable members when said lid is in its second position thereby sealing said deformable member to the body member to close the open end of the respective recess.

3. The combination of claim 2 wherein said lid has a side with ridges alternating with depressions and said body member is provided with corresponding ridges and depressions so that said lid is snappingly coupleable to said body member.

4. The combination of claim 2 wherein said lid has a stop step for cooperation with a corresponding shoulder formed in the body member.

* * * * *